US012508886B2

United States Patent
Neumann et al.

(10) Patent No.: US 12,508,886 B2
(45) Date of Patent: Dec. 30, 2025

(54) WIND DEFLECTOR HAVING AN INTEGRATED DRIVE

(71) Applicant: Bayerische Motoren Werke Aktiengesellschaft, Munich (DE)

(72) Inventors: Peter Neumann, Karlsfeld (DE); Klaus Seibt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 366 days.

(21) Appl. No.: 18/275,429

(22) PCT Filed: Mar. 2, 2022

(86) PCT No.: PCT/EP2022/055225
§ 371 (c)(1),
(2) Date: Aug. 2, 2023

(87) PCT Pub. No.: WO2022/199999
PCT Pub. Date: Sep. 29, 2022

(65) Prior Publication Data
US 2024/0100922 A1  Mar. 28, 2024

(30) Foreign Application Priority Data
Mar. 22, 2021 (DE) ............ 10 2021 107 027.9

(51) Int. Cl.
*B60J 7/22* (2006.01)
*B60J 1/18* (2006.01)
(52) U.S. Cl.
CPC ............ *B60J 7/223* (2013.01); *B60J 1/1823* (2013.01)

(58) Field of Classification Search
CPC . B60J 7/22; B60J 7/7223; B60J 1/1807; B60J 1/1823; B60J 1/20; B60J 9/04; B62D 35/00; B62D 35/007
(Continued)

(56) References Cited

U.S. PATENT DOCUMENTS 7,367,608 B2 * 5/2008 Rimmelspacher ....... B60J 7/223
                                              296/180.1
7,784,853 B2 * 8/2010 Erb .................. E05B 79/20
                                              296/180.1
(Continued)

FOREIGN PATENT DOCUMENTS

CN    104411574 A    3/2015
CN    110847670 A    2/2020
(Continued)

OTHER PUBLICATIONS

DE102020123792A1 and English Translation; Seibt et al.; Mar. 17, 2022 (Year: 2025).*
(Continued)

*Primary Examiner* — Roger L Pang
(74) *Attorney, Agent, or Firm* — Crowell & Moring LLP

(57) ABSTRACT

A wind deflector for a convertible vehicle includes a lower frame, which can be fixedly mounted to the vehicle, and an upper frame, on which a wind deflector is formed. The upper frame can be pivoted relative to the lower frame about a deployment axis, between a laid-down position and a wind protection position, by use of a drive. The upper frame and the lower frame are pivotably interconnected via at least two bearing points. The upper frame is operatively connected to the lower frame by a drive thread, and the drive thread is operatively connected to the drive. One of the bearing points has at least one preloading device.

11 Claims, 1 Drawing Sheet

(58) Field of Classification Search
USPC .......................................... 296/180.1, 180.5
See application file for complete search history.

(56) References Cited

U.S. PATENT DOCUMENTS

| | | | |
|---|---|---|---|
| 2002/0175539 A1 | 11/2002 | Biecker et al. | |
| 2008/0061599 A1* | 3/2008 | Goetz ...................... | B60J 7/223 296/180.5 |
| 2011/0018307 A1 | 1/2011 | Rimmelspacher et al. | |
| 2015/0108783 A1 | 4/2015 | Rowley et al. | |
| 2015/0210148 A1* | 7/2015 | Neumann ................. | B60J 7/223 296/180.1 |

FOREIGN PATENT DOCUMENTS

| | | |
|---|---|---|
| DE | 39 23 558 A1 | 3/1990 |
| DE | 197 14 938 A1 | 10/1998 |
| DE | 10 2014 222 126 A1 | 1/2016 |
| EP | 2 030 823 A2 | 3/2009 |
| EP | 2 277 730 A1 | 1/2011 |

OTHER PUBLICATIONS

English translation of DE102014222126A1; https://translationportal.epo.org; Oct. 8, 2025 (Year: 2025).*
International Search Report (PCT/ISA/210) issued in PCT Application No. PCT/EP2022/055225 dated Jun. 13, 2022 with English translation (4 pages).
German-language Written Opinion (PCT/ISA/237) issued in PCT Application No. PCT/EP2022/055225 dated Jun. 13, 2022 (5 pages).
German-language Search Report issued in German Application No. 10 2021 107 027.9 dated Oct. 5, 2021 with partial English translation (10 pages).
English translation of Chinese-language Office Action issued in Chinese Application No. 202280008884.8 dated Aug. 23, 2025 (9 pages).

* cited by examiner

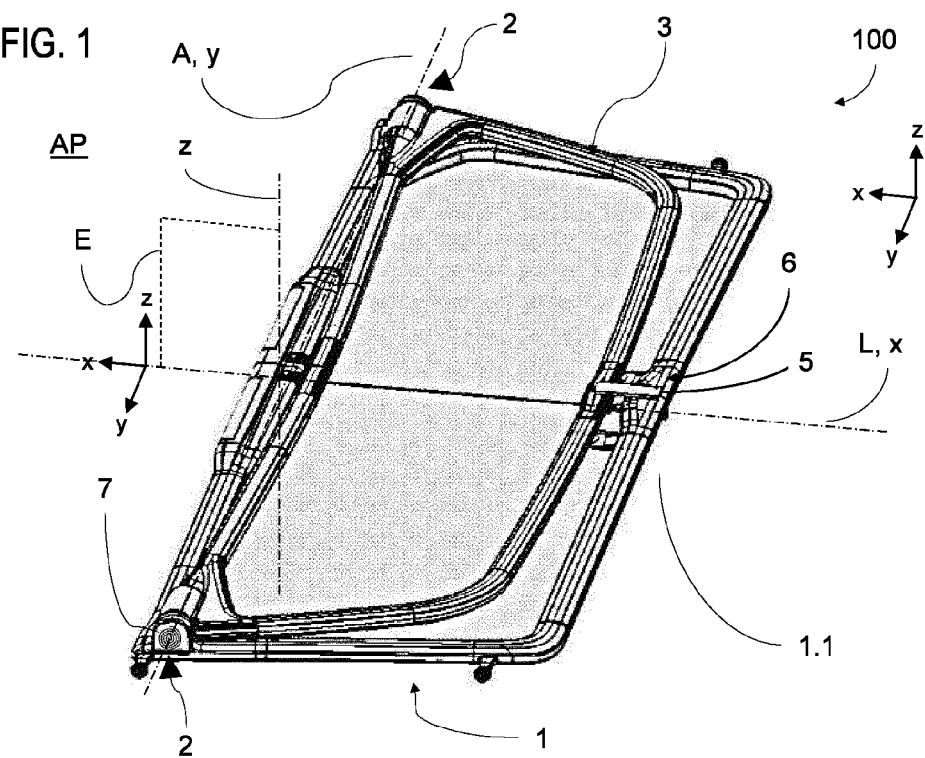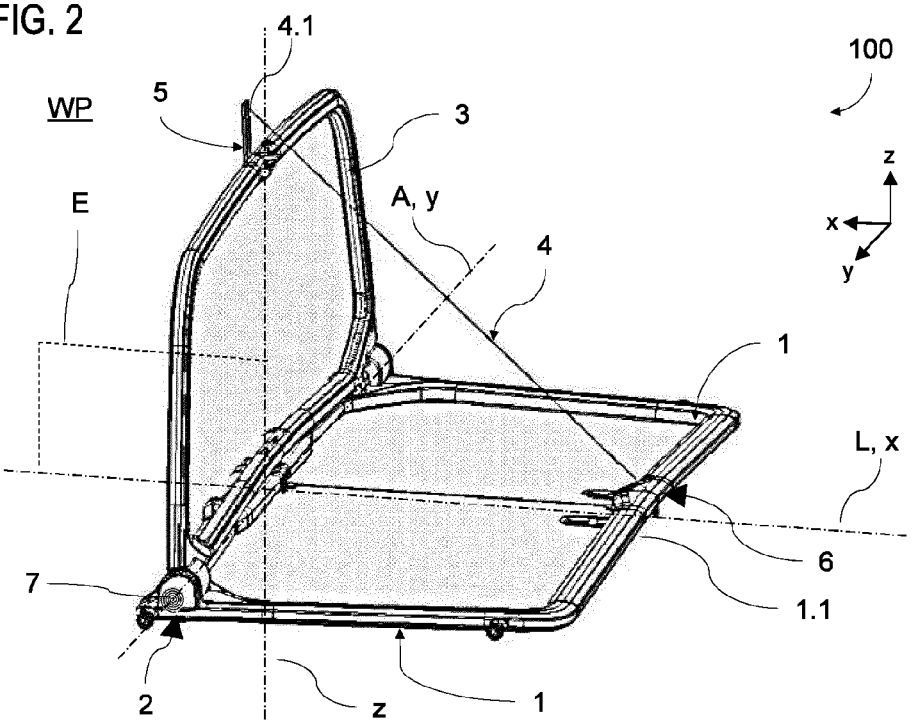

WIND DEFLECTOR HAVING AN INTEGRATED DRIVE

BACKGROUND AND SUMMARY

The invention relates to a wind deflector having an integrated drive, comprising a lower frame and an upper frame which is pivotable with respect thereto. The invention also relates to a convertible having such a wind deflector.

As is known, wind deflectors for convertibles are often embodied such that a lower frame is movably connected to an upper frame by way of in most cases two bearing points, which are arranged at the front of the lower frame in a direction of travel of a convertible and in each case toward the outer side of the vehicle. The upper frame and the lower frame are pivotably connected by way of a pivot axis or deployment axis running through the two bearing points.

The size of the wind deflector is generally of maximum design, in order to obtain the maximum wind protection. Such a maximum design is limited for example by the size of the lower frame (in particular with respect to a vehicle longitudinal direction). Here, various interfaces with, and boundary conditions in, the vehicle additionally have to be taken into account. The maximum design is generally predefined by the boundary conditions in the vehicle.

In the case of such a wind deflector, there is, in the installed state, a position in which the upper frame is stored on the lower frame and the wind deflector is correspondingly not operative, i.e., the storage position. Furthermore, there is a position in which the upper frame is deployed or pivoted in relation to the lower frame and the wind deflector protects the passengers in the front seats from wind or draught air, i.e., the wind protection position. This pivoting of the upper frame with respect to the lower frame from the storage position into the wind protection position is effected for example in a range from approximately 80° to 110°. The angular position is fixed by way of a latching means in the two bearings.

The wind deflector is generally operated manually. This means the driver or passenger either has to get out of the vehicle in order to be able to unfold or fold down the upper frame or has to perform ergonomically inconvenient movements in order to be able to operate the upper frame from their seat.

In principle, the wind deflector is intended to be operated only when the vehicle is at a standstill, since during travel the inconvenient ergonomics present too great a distraction for the driver, and/or wind load on the upper frame makes the operation difficult.

Against this background, it is an object of the invention to improve a wind deflector for a convertible.

This object is achieved by means of a wind deflector and a convertible having such a wind deflector, in accordance with the independent claims. The dependent claims relate to advantageous refinements.

According to one aspect, a wind deflector for a convertible has a lower frame, which is mountable fixed to a vehicle, and an upper frame. The upper frame is pivotable with respect to the lower frame about a deployment axis between a storage position and a wind protection position by means of a drive. The upper frame and the lower frame are pivotably connected to one another by way of at least two bearing points. The upper frame is operatively connected to the lower frame by way of a drive thread, wherein the drive thread is operatively connected to the drive. One of the bearing points has at least one pretensioning device which pretensions the upper frame into the wind protection position.

This has the advantage that the upper frame is pretensioned into the wind protection position by a pretensioning force of the at least one pretensioning device, and is held under tension by the operative connection of the drive thread between the upper frame and the lower frame. It is thus possible for the known fluttering of the upper frame to be reduced or eliminated and for the upper frame to be held in any desired position between the storage position and the wind protection position.

By means of the operative connection of the drive to the drive thread, which in turn operatively connects the upper frame to the lower frame, the upper frame can be pulled counter to the pretensioning force with respect to the lower frame and thus the upper frame can be moved between the wind protection position and the storage position.

It is, of course, also possible to provide a plurality of, for example two, drive threads which are either operatively connected to a common drive or are each operatively connected to a dedicated drive. Preferably, in the case of a plurality of drive threads, these are arranged symmetrically with respect to a central plane, such that the introduction of force into the upper frame is uniform.

According to a further aspect, the drive is either arranged on the upper frame or on the lower frame. This has the advantage that the drive can be arranged on the respective wind deflector according to the individual structural, operational, etc. requirements.

According to a further aspect, the drive is arranged on a rear portion of the lower frame. This has the advantage that the drive is arranged in a position allowing a cost-effective and functionally optimized arrangement of the drive and the drive thread, since the drive thread runs between the upper frame and the rear portion of the lower frame and can thus be pulled by the drive in an optimal manner.

According to a further aspect, the upper frame has an extension and the drive thread is connected to the extension at an attachment point. This has the advantage that, for example in the case of an upper frame whose rear end (in the imaginary direction of travel of a convertible having the wind deflector) is not congruent with, but rather is shorter than, a rear end of the lower frame, i.e. the rear end of the upper frame is closer to the deployment axis than the rear end of the lower frame in the storage position, the drive thread then runs in a more favorable manner when the upper frame approaches the lower frame during the storage operation.

According to a further aspect, the drive winds the drive thread. This has the advantage that the drive thread is always in a controllable state, and the drive and the drive thread can be integrated into the wind deflector in an appealing manner.

According to a further aspect, a total action of the drive thread with respect to a transverse direction of the wind deflector acts parallel to a central plane of the wind deflector. This has the advantage that the upper frame is rarely subjected to non-uniform loading, if at all, and thus for example the bearings do not have to be of different dimension and the upper frame deforms.

According to a further aspect, the drive thread is fastened to the lower frame or upper frame centrally or in a centrally offset manner. If, for example, the wind deflector, as is known in the prior art, is intended to be embodied so as to be foldable parallel to its longitudinal direction (parallel to the direction of travel or longitudinal direction), the drive thread may be fastened to the lower frame or upper frame in a centrally offset manner, since otherwise it is more difficult to be able to ensure the central foldability of the wind deflector. In the case of a wind deflector which is foldable parallel to its longitudinal direction, the drive may of course also be arranged centrally, if the wind deflector is folded in a centrally offset manner or the two frame halves of the lower frame are correspondingly coordinated with one another (for example by way of cutouts for at least parts of the drive).

According to a further aspect, the drive thread is arranged parallel to a central plane of the wind deflector. This has the advantage that the action of the drive is efficient, since no transverse pull with a component parallel to a transverse direction (y axis) is produced.

According to a further aspect, the drive thread is deflected on a rear portion of the lower frame. This has the advantage that the drive can be arranged as desired on the wind deflector. For example, the drive can be arranged in the region of the deployment axis of the upper frame and the upper frame can nevertheless be pulled by means of the drive thread on a rear portion of the lower frame. In this case, the drive thread runs parallel to the longitudinal direction from the drive at the deployment axis to the deflecting means on the rear portion of the lower frame, and from there to the upper frame.

According to a further aspect, the wind deflector comprises a power supply and/or actuator for the drive. This may for example be a power supply on the wind deflector, such as a battery, or a connection to the convertible so that the power is supplied by way of the convertible. Furthermore, an operating device (for example a switch) may for example be arranged at an ergonomically convenient position of the wind deflector so that the drive can be actuated. In addition or as an alternative, the drive may also be actuated by way of an operating device installed in the convertible and/or by way of an app and/or a radio-based remote control (for example a key).

According to a further aspect, a convertible has a wind deflector according to one of the preceding aspects. Further advantages and use possibilities of the invention will emerge from the following description in conjunction with the figures.

BRIEF DESCRIPTION OF THE DRAWINGS

FIG. 1 is a perspective view of a wind deflector according to an exemplary embodiment of the invention, an upper frame being arranged in a storage position.

FIG. 2 is a perspective view of the wind deflector from FIG. 1, the upper frame being arranged in the wind protection position.

DETAILED DESCRIPTION OF THE DRAWINGS

FIG. 1 shows a wind protector 100 according to an exemplary embodiment of the invention, an upper frame 3 being stored on a lower frame 1 in a storage position AP. The upper frame 3 is connected to the lower frame by way of two bearing points 2. A deployment axis A runs parallel to a transverse direction (y axis) through the bearing points 2. Furthermore, the bearing points 2 each comprise a pretensioning device 7, which pretension the upper frame 3 in such a way that it pivots about the deployment axis A into the wind protection position shown in FIG. 2. In the storage position AP, an extension 5 and the drive 6 are in alignment. In the shown exemplary embodiment of the invention, the upper frame 3 is shorter than the lower frame 1. This means that a rear end of the upper frame 3 is arranged closer to the deployment axis A than a rear end of the lower frame 1, as can be seen in FIG. 1.

FIG. 2 shows the wind deflector 100 pivoted into the wind protection position WP. The upper frame 3 comprises the extension 5 to which a drive thread 4 is fastened at an attachment point 4.1. The drive thread 4 is operatively coupled to a drive 6 which is arranged in a rear portion 1.1 of the lower frame 1. In this way, the drive thread 4 acts counter to the pretensioning force of the pretensioning devices 7, and the upper frame 3 is thus settable in any desired position between the storage position AP and the wind protection position WP. If a pulling force of the drive 6 exceeds the pretensioning force, the upper frame 3 is pulled onto the lower frame 1. If the drive thread 4 is relaxed, the upper frame 3 pivots about the deployment axis A into the wind protection position WP as a result of the pretensioning force.

The drive thread 4 may, for example, be embodied as a chord or from a natural material or a synthetic material, and, if required for the design of the system, from a flexible, in particular elastic, material. It goes without saying that the drive thread 4 itself can have any color; however, with regard to the appearance of the wind deflector, an embodiment in black or with a transparent material may be preferred. In the illustrated embodiment, the drive thread 4 is wound and unwound in the drive 6, such that no loose thread end can be seen and the drive thread 4 is always in a controlled state.

In the illustrated embodiment, the wind deflector 100 is foldable centrally parallel to the longitudinal direction (x axis) in such a way that the bearings 2 come into alignment with one another. The attachment point 4.1 on the extension 5 of the upper frame 3 is therefore mounted in a centrally offset manner, i.e. spaced apart from the longitudinal direction (x axis) and spaced apart from or parallel to a central plane E, which is defined by the longitudinal direction L and the vertical direction (z axis). The spacing is expediently selected to be as small as possible, such that the pull of the drive thread is introduced into the upper frame 3 in the least eccentric manner possible and the folding of the wind deflector 100 is nevertheless possible. In the illustrated embodiment, the extension 5 is arranged centrally on the upper frame 3 and only the attachment point 4.1 in the extension 5 is mounted in a centrally offset manner, such that the wind deflector 100 can be folded and the drive thread 4 runs parallel to the central plane E from the attachment point 4.1 to the drive 6.

LIST OF REFERENCE DESIGNATIONS

1 Lower frame
1.1 Rear portion of the lower frame
2 Bearing points
3 Upper frame
4 Drive thread
4.1 Attachment point
5 Extension
6 Drive
7 Pretensioning device
100 Wind deflector
A Deployment axis
AP Storage position
E Central plane
WP Wind protection position
X Longitudinal direction
Y Transverse direction
Z Vertical direction

The invention claimed is:

1. A wind deflector for a convertible, comprising:
   a lower frame which is mountable fixed to a vehicle;
   an upper frame which is pivotable with respect to the lower frame about a deployment axis between a storage position and a wind protection position;
   at least two bearing points, wherein the upper frame and the lower frame are pivotably connected to one another by way of the at least two bearing points;
   a drive thread by which the upper frame is operatively connected to the lower frame;
   a drive, wherein the drive thread is operatively connected to the drive; and
   wherein at least one of the at least two bearing points has a pretensioning device which pretensions the upper frame into the wind protection position.

2. The wind deflector according to claim 1, wherein the drive is arranged either on the upper frame or on the lower frame.

3. The wind deflector according to claim 1, wherein the drive is arranged on a rear portion of the lower frame.

4. The wind deflector according to claim 1, wherein the upper frame has an extension, and the drive thread is connected to the extension at an attachment point.

5. The wind deflector according to claim 1, wherein the drive winds the drive thread.

6. The wind deflector according to claim 1, wherein a total action of the drive thread with respect to a transverse direction of the wind deflector acts parallel to a central plane of the wind deflector.

7. The wind deflector according to claim 1, wherein the drive thread is fastened to the lower frame or upper frame centrally or in a centrally offset manner.

8. The wind deflector according to claim 1, wherein the drive thread is arranged parallel to a central plane of the wind deflector.

9. The wind deflector according to claim 1, wherein the drive thread is deflected on a rear portion of the lower frame.

10. The wind deflector according to claim 1, further comprising:
    a power supply and/or actuator for the drive arranged in or on the wind deflector.

11. A convertible comprising a wind deflector according to claim 1.

* * * * *